United States Patent
Clemm et al.

(10) Patent No.: US 9,531,589 B2
(45) Date of Patent: Dec. 27, 2016

(54) AUTOMATING MONITORING USING CONFIGURATION EVENT TRIGGERS IN A NETWORK ENVIRONMENT

(71) Applicant: CISCO TECHNOLOGY, INC., San Jose, CA (US)

(72) Inventors: Ludwig Alexander Clemm, Los Gatos, CA (US); Wojciech Dec, Amsterdam Zuid-Oost (NL)

(73) Assignee: CISCO TECHNOLOGY, INC., San Jose, CA (US)

( * ) Notice: Subject to any disclaimer, the term of this patent is extended or adjusted under 35 U.S.C. 154(b) by 278 days.

(21) Appl. No.: 14/292,366

(22) Filed: May 30, 2014

(65) Prior Publication Data

US 2015/0350015 A1 Dec. 3, 2015

(51) Int. Cl.
*G06F 15/177* (2006.01)
*H04L 12/24* (2006.01)
*H04L 12/26* (2006.01)

(52) U.S. Cl.
CPC ......... *H04L 41/0813* (2013.01); *H04L 43/062* (2013.01); *H04L 43/0829* (2013.01)

(58) Field of Classification Search
CPC ............... H04L 41/0813; H04L 43/062; H04L 43/0829; H04L 67/10
See application file for complete search history.

(56) References Cited

U.S. PATENT DOCUMENTS

| 7,552,238 | B2 | 6/2009 | Gulland | |
|---|---|---|---|---|
| 8,370,462 | B2 | 2/2013 | Pelletier et al. | |
| 8,595,476 | B2 | 11/2013 | Ennis et al. | |
| 8,719,398 | B2 * | 5/2014 | Qian | H04L 41/5003 370/250 |
| 2006/0041658 | A1 * | 2/2006 | Nelson | H04L 41/0853 709/224 |
| 2011/0238817 | A1 * | 9/2011 | Okita | H04L 41/142 709/224 |
| 2013/0007441 | A1 * | 1/2013 | Stern | H04L 12/4641 713/100 |

(Continued)

FOREIGN PATENT DOCUMENTS

WO WO 2005/054987 6/2005
WO WO 2006/120438 11/2006

*Primary Examiner* — Jonathan Bui
(74) *Attorney, Agent, or Firm* — Patent Capital Group

(57) ABSTRACT

An example method for automating monitoring using configuration event triggers in a network environment is provided and includes receiving a change request for a configuration change, creating a change impact monitor according to a profile associated with the configuration change, taking a first snapshot of performance indicators when the configuration change is applied, taking a second snapshot of the performance indicators a predetermined duration after applying the configuration change, and generating a change impact notification describing the first snapshot and the second snapshot. The profile can specify the performance indicators for the configuration change. A change agent that creates the change impact monitor may also be invoked. In some embodiments, the method can further include receiving a soak command, and taking a third snapshot of the performance indicators before applying the configuration change.

17 Claims, 4 Drawing Sheets

(56) References Cited

U.S. PATENT DOCUMENTS

| | | | |
|---|---|---|---|
| 2013/0067066 A1* | 3/2013 | Dickens | H04L 41/0823 709/224 |
| 2013/0332594 A1* | 12/2013 | Dvir | G06F 11/00 709/224 |
| 2015/0113338 A1* | 4/2015 | Maruyama | G06F 11/3037 714/48 |
| 2015/0333992 A1* | 11/2015 | Vasseur | H04L 12/4633 370/252 |

* cited by examiner

AUTOMATING MONITORING USING CONFIGURATION EVENT TRIGGERS IN A NETWORK ENVIRONMENT

TECHNICAL FIELD

This disclosure relates in general to the field of communications and, more particularly, to automating monitoring using configuration event triggers in a network environment.

BACKGROUND

Networks, such as data centers are increasingly used by enterprises for effective collaboration and interaction and to store data and resources. A typical network can contain myriad network devices, including hosts, load balancers, routers, switches, etc. The network connecting the network devices provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for automating monitoring using configuration event triggers in a network environment is provided and includes receiving a change request (e.g., an appropriate message requesting a change) for a configuration change (e.g., change of configuration settings, parameters, etc.) at a network device in a network, creating a change impact monitor according to a profile associated with the configuration change, taking a first snapshot of performance indicators when the configuration change is applied, taking a second snapshot of the performance indicators a predetermined duration after applying the configuration change, and generating a change impact notification describing the first snapshot and the second snapshot.

As used herein, the term "network device" is meant to encompass computers, network appliances, servers, routers, switches, gateways, bridges, load balancers, firewalls, processors, modules, or any other suitable device, component, element, or object operable to exchange information in a network environment. Moreover, the network devices may include any suitable hardware, software, components, modules, interfaces, or objects that facilitate the operations thereof. This may be inclusive of appropriate algorithms and communication protocols that allow for the effective exchange of data or information.

Example Embodiments

Figure 1:
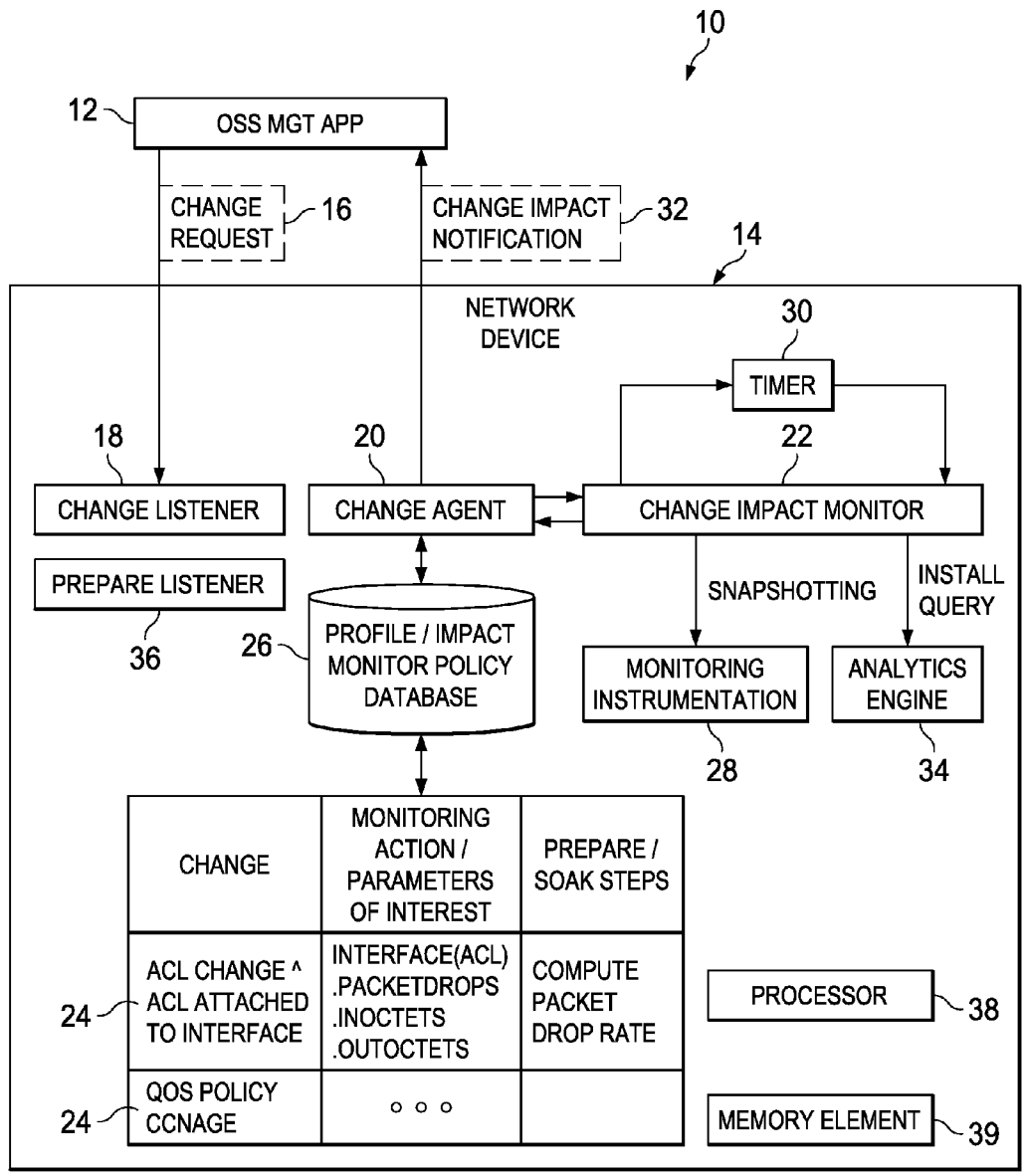
FIG. 1 is a simplified block diagram illustrating a communication system for automating monitoring using configuration event triggers in a network environment.

Turning to FIG. 1, FIG. 1 is a simplified block diagram illustrating a communication system 10 for automating monitoring using configuration event triggers in a network environment in accordance with one example embodiment. FIG. 1 illustrates a communication system 10 comprising an operations support system (OSS) management application 12 that communicates with a network device 14. OSS management application 12 may send a change request 16 seeking to change certain configuration settings of network device 12. In some embodiments, change request 16 may be entered and sent through an appropriate graphical user interface (GUI) at OSS management application 12; in other embodiments, change request 16 may be entered and sent through an appropriate command line interface (CLI) at OSS management application 12; in yet other embodiments, OSS management application 12 may generate change request 16 based on predetermined settings, network events, etc. Any suitable trigger (e.g., user input, machine input, network events, etc.) may trigger generation and transmittal of change request 16 at OSS management application 12. Change request 16 may be transmitted to network device 14 in any suitable format, protocol, etc. within the broad scope of the embodiments. A change listener 18 executing in network device 14 may receive change request 16. Change listener 18 may invoke a change agent 20 that invokes creation of a change impact monitor 22 according to a profile 24 stored in a profile/impact monitor policy database 26.

Change impact monitor 22 may interact with monitoring instrumentation 28 and take snapshots (e.g., a snapshot refers to a capture of a system state at a particular instant of time) of certain performance indicators at the time the configuration change is applied. "Performance indicators" as used herein include any network parameters that control or affect interaction of network devices over the network and impact network performance (e.g., measures of service quality of a telecommunications product as seen by the network's customer). Examples of performance indicators include quality of service (QoS), packet drop rate, throughput, etc. Change impact monitor 22 may also operate (e.g., start, terminate, etc.) a change impact assessment timer (referred to herein as simply 'timer') 30. Change agent 20 may put the snapshot values into a change impact notification 32, a message that may be sent to OSS management application 12. In some embodiments, change impact monitor 22 may install a local analytics query (e.g., request, question, inquiry, etc.) issued against a local analytics engine 34, for example, to compute statistical profiles. In some embodiments, a prepare listener module 36 may be invoked to determine configuration change impacts before and after the configuration change is applied.

Embodiments of communication system 10 facilitate communication of configuration change impacts on network device 12 through change impact notification 32, which can comprise a delayed notification that is sent some time after the configuration change is applied on network device 12. Change impact notification 32 may include performance indicators that may have been impacted by the configuration change. Embodiments of communication system 10 can facilitate a temporary monitor (e.g., change impact monitor 22) that may be automatically (e.g., without external intervention from outside network device 12) invoked when a configuration change is applied. In various embodiments, change impact monitor 22 may execute instructions according to specifications of profile 24. In some embodiments, a soak step may be added to precede certain (e.g., critical, important, significant, etc.) configuration commands, allowing to take a 'baseline' of performance indicators for comparison before and after the configuration change is applied.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Configuration changes made to network devices have an impact on their behavior. The behavior often manifests itself in certain performance indicators (e.g., operational state parameters, network traffic statistics). For example, a change in the configuration of an Access Control List (ACL) may result in a change of packet drop rates of interfaces to which the ACL is attached; a change in QoS policy may result in a change of throughput for certain types of traffic on the device; a change in performance routing (PfR) policy may lead to changes in ingress and egress traffic rates on associated interfaces; etc.

In many cases, the observed performance indicator changes are the reasons why the configuration changes were made. However, in many cases the magnitude of the impact is not adequately understood. Some configuration changes may have a smaller or a greater effect than anticipated. In other cases, changes may have impact or consequences that were not anticipated. According to some studies, more than half of network outages and security vulnerabilities are rooted in configuration changes with unintended consequences.

Hence it may be useful that users and applications are able to understand the effect that configuration changes have on the network devices. With an increasing number of knobs to control network behavior and shortened control cycles, the need to understand configuration change impact may increase in the future. However, today's networks are ill-equipped in this regard. As configuration change notifications are still far from ubiquitous, in many cases, users and applications do not even know which configuration changes are occurring, let alone the effects of the configuration changes and the corresponding impact on observable changes in performance indicators. It is up to users to monitor statistics and performance indicators in the aftermath of configuration changes. Today, this requires extra effort and therefore typically does not occur. Users may also not be aware of the performance indicators corresponding to types of configuration changes.

Communication system 10 is configured to offer a system and method for automating monitoring using configuration event triggers in a network environment. Embodiments of communication system 10 can facilitate a capability that allows users and applications to monitor effects of configuration changes in a way that can be substantially fully automated and simple to use. The capability can allow a system to send change impact notification 32 a certain time after the configuration change is applied, providing a user or management application (e.g., OSS management application 12) with an update of possible effects of the configuration change. Change impact notification 32 may reference the configuration change, and include an update of performance indicators observed after the configuration change. Change impact notification 32 can makes OSS management application 12 aware of the behavior of performance indicators.

According to embodiments of communication system 10, when the configuration change is applied, change agent 20 may invoke creation of change impact monitor according to profile 24 associated with the type of configuration change. For example, for an ACL configuration change, monitoring actions may comprise monitoring a number of incoming packets, outgoing packets, and packet drops; a soak step associated therewith may comprise computation of packet drop rate at the interface on which the ACL configuration change is applied. Accordingly, change impact monitor 22 may take a snapshot of performance indicators (e.g., number of incoming packets, outgoing packets, and packet drops) at the time the configuration change is applied using monitoring instrumentation 28. By way of examples, and not limitations, monitoring instrumentation 28 can include Cisco™ data collection manager (DCM), management information base (MIB), NetFlow™, etc.

Change impact monitor 22 may start timer 30. When timer expires 30 expires (e.g., after a predetermined duration), another snapshot may be taken. Change agent 20 may put the snapshot values into change impact notification 32 and send it to OSS management application 12, along with the times at which the snapshots were taken and the identifier of the configuration change (e.g., request identifier (ID) of the configuration, or the event identifier of the associated configuration change notification, etc.).

In various embodiments, profile 24 may comprise a particular type of network policy. Profile 24 may specify performance indicators (e.g., network statistics, operational state, etc.) that may be of interest for a given type of configuration change. In other words, the performance indicators may depend on the specific configuration change command and, in some cases, the configuration change parameters. An example profile 24 is as follows: "when a change to an ACL is made, monitor inOctets, outOctets, and packetDropCounts of each interface that the ACL is attached to." In a general sense, profile 24 can include specifications of the performance indicators to track, monitor, analyze, etc. corresponding to a configuration change. If the specified configuration change is not part of any profile 24 in profile/impact monitor policy database 26, a pre-configured default profile 24 may be invoked. Any number of extensions and refinements may be included in profile 24 within the broad scope of the embodiments. The performance indicators typically involve counter values. In some embodiments, rather than transmitting raw counter value snapshots, change agent 20 can instead compute a rate from the differences in counter values and the amount of time that passed between the snapshots.

In some embodiments, an additional snapshot of the performance indicators may be taken some time before the configuration change is actually applied, for example, to allow for a comparison with the performance indicators after the configuration change is applied. The configuration change may be preceded with a soak period, for example, with a 'soak' command, possibly coupled with a 'prepare' command in case of transactional configuration commands (e.g., commands that configure workflows, or transactions).

In some embodiments, multiple measurements may be taken to compute or establish a baseline for the change impact. For example, certain network monitoring instruments may include only counters (e.g., of packets transmitted, received, etc.). To find out the rate (e.g., of transmission, receipt, etc.), at least two snapshots separated in time may be necessary (e.g., one snapshot at time t, another 30 seconds later at t+30, and the rate is computed by determining the difference of the measurements over the 30 seconds). The measurements may be extrapolated as appropriate to get rates according to different time periods, for example, minutes, hours, etc. Thus, if it is necessary to determine the rate before the configuration change is applied, a certain lead time may be allowed to take appropriate snapshots for the computation.

In some embodiments, change request 16 may be arrive at network device 14 pre-associated with a "soaking" benchmark policy; in other embodiments, change agent 20 may be configured to retrieve such an associated policy. In many embodiments, the soaking policy may comprise an instruction to persist change if soaking results in performance improvement (e.g., a configuration change Y may be coupled to a "persist change if soaking results in improvement of x %" policy arriving together (with change request 16) or on request to OSS management application 12 by change agent 20.

The prepare command may invoke prepare listener module 36. The soak command may trigger creation of change impact monitor 22 in advance of change request 16 (or before the configuration command is applied). Change impact monitor 22 may take a (third) monitoring snapshot, which can be used to calculate 'before' and 'after' rates, for example, wherein the 'after' rates are determined from snapshots taken after the configuration change is applied. In case the soak command is not followed with change request 16 (e.g., configuration request is not sent), change impact monitor 22 may be eventually aborted.

Soak and change impact assessment timers (e.g., timer 30) can be configurable by users or depend on the particular profile (e.g., profile 24). Profile(s) 24 can include advanced processing capabilities, for example, starting a local analytics query issued against analytics engine 34 (if available in network device 12) to compute a statistical profile (e.g., drop rate calculation, top percentage of traffic diverted, and other statistical parameters). Profile(s) 24 can be configurable by the user (e.g., network operator or administrator).

The interpretation of the statistics and performance indicators may be performed by OSS management application 12 in some embodiments. In many cases, factors (e.g., changes in traffic mix and traffic patterns, other configuration changes, or other changes in network state such as route changes) other than the configuration change may contribute to changes in performance indicators. Accordingly, the observed values of the performance indicators may not be solely caused or rooted in the configuration change itself. Nevertheless, automatic feedback to the user regarding the current status of the performance indicators in the aftermath of the configuration change can be useful.

Embodiments of communication system 10 can enable users and applications to better assess and understand effects of configuration changes, including changes to related performance indicators that are observed in the aftermath of such changes. Embodiments of communication system 10 can allow users and applications to understand the potential magnitude of the effect of the configuration changes, to more easily validate if the desired effects are indeed occurring, and to potentially recognize any undesired effects (among other potential uses).

In various embodiments, OSS management application 12 may comprise an application executing in a server or other network device in a network comprising network device 12. In some embodiments, OSS management application 12 may execute locally in network device 12; in other embodiments, OSS management application 12 may execute remote from network device 12. The various components of communication system 10, for example, change listener 18, change agent 20, change impact monitor 22, etc. may comprise software constructs (e.g., objects, executables, files, etc.) instantiated within network device 12, for example, using processor 38 and memory element 39. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

Figure 2:
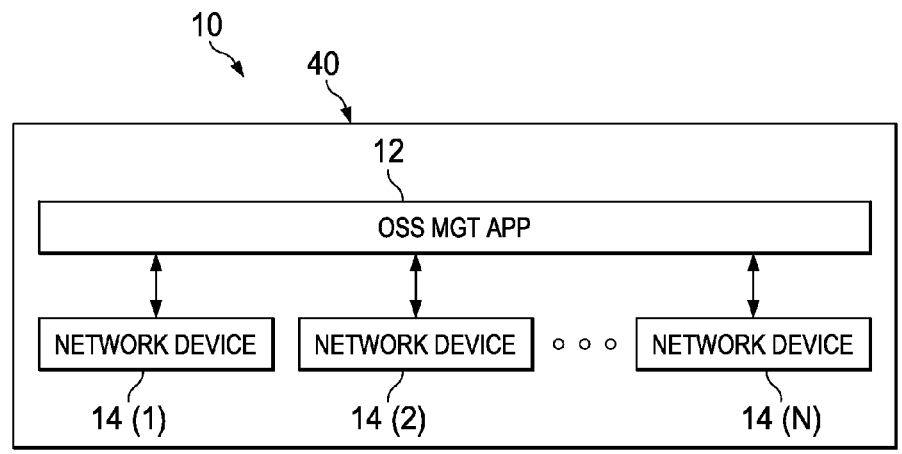
FIG. 2 is a simplified block diagram illustrating example details of an embodiment of the communication system.

Turning to FIG. 2, FIG. 2 is a simplified block diagram illustrating example details of another embodiment of communication system 10. Communication system 10 may execute in a network 40, wherein OSS management application 12 may communicate with, and manage, configuration changes in a plurality of network devices 14(1)-14(N), where N is any integer greater than 1. The network topology of network 40 can include any number of servers, hardware accelerators, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network, for example, network 40.

The example network environment of network 40 may be configured over a physical infrastructure that may include one or more networks and, further, may be configured in any form including, but not limited to, local area networks (LANs), wireless local area networks (WLANs) (including Bluetooth), wired LANs, VLANs, metropolitan area networks (MANs), VPNs, Intranet, Extranet, any other appropriate architecture or system, or any combination thereof that facilitates communications in a network.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Figure 3:
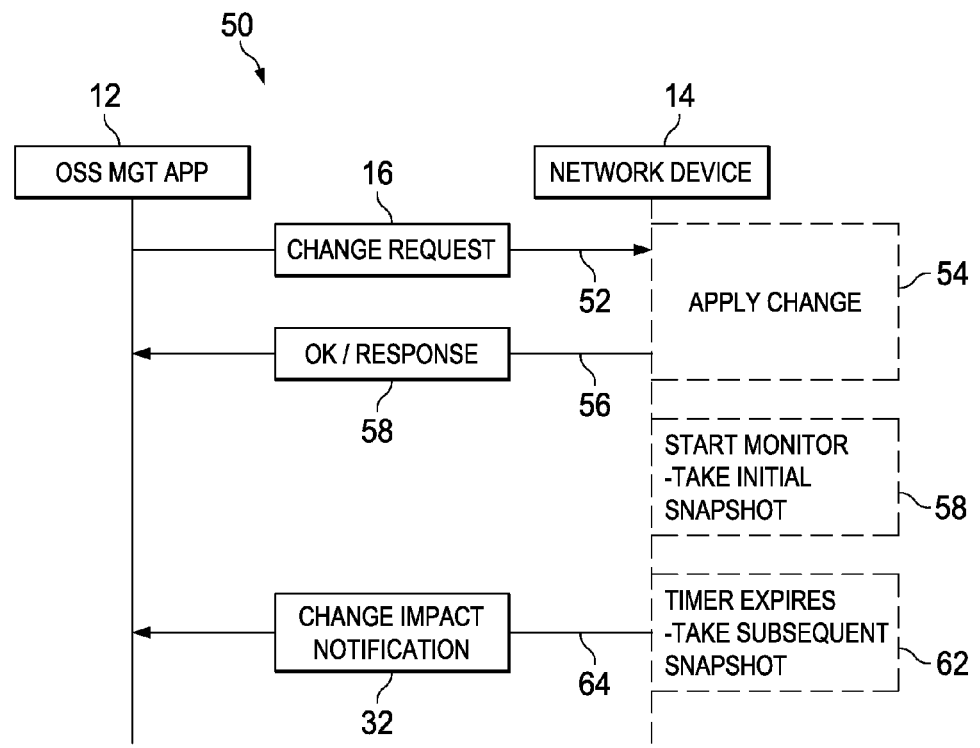
FIG. 3 is a simplified sequence diagram illustrating example operations that may be associated with an embodiment of the communication system.

Turning to FIG. 3, FIG. 3 is a simplified sequence diagram, indicating sequences 50 that may be associated with embodiments of communication system 10. At 52, OSS management application 12 may sent change request 16 to network device 14. At 54, the configuration change may be applied at network device 14. At 56, an OK/response 58 may be sent to OSS management application 12 indicating that the configuration change was applied. At 58, an initial snapshot of performance indicators may be taken. For example, change impact monitor 22 may be invoked, and monitoring instrumentation 28 may be activated appropriately. At 62, timer 30 may expire and another snapshot may be taken. At 64, change impact notification 32 may be sent to OSS management application 12, including the snapshots of the performance indicators according to appropriate policy 24.

Figure 4:
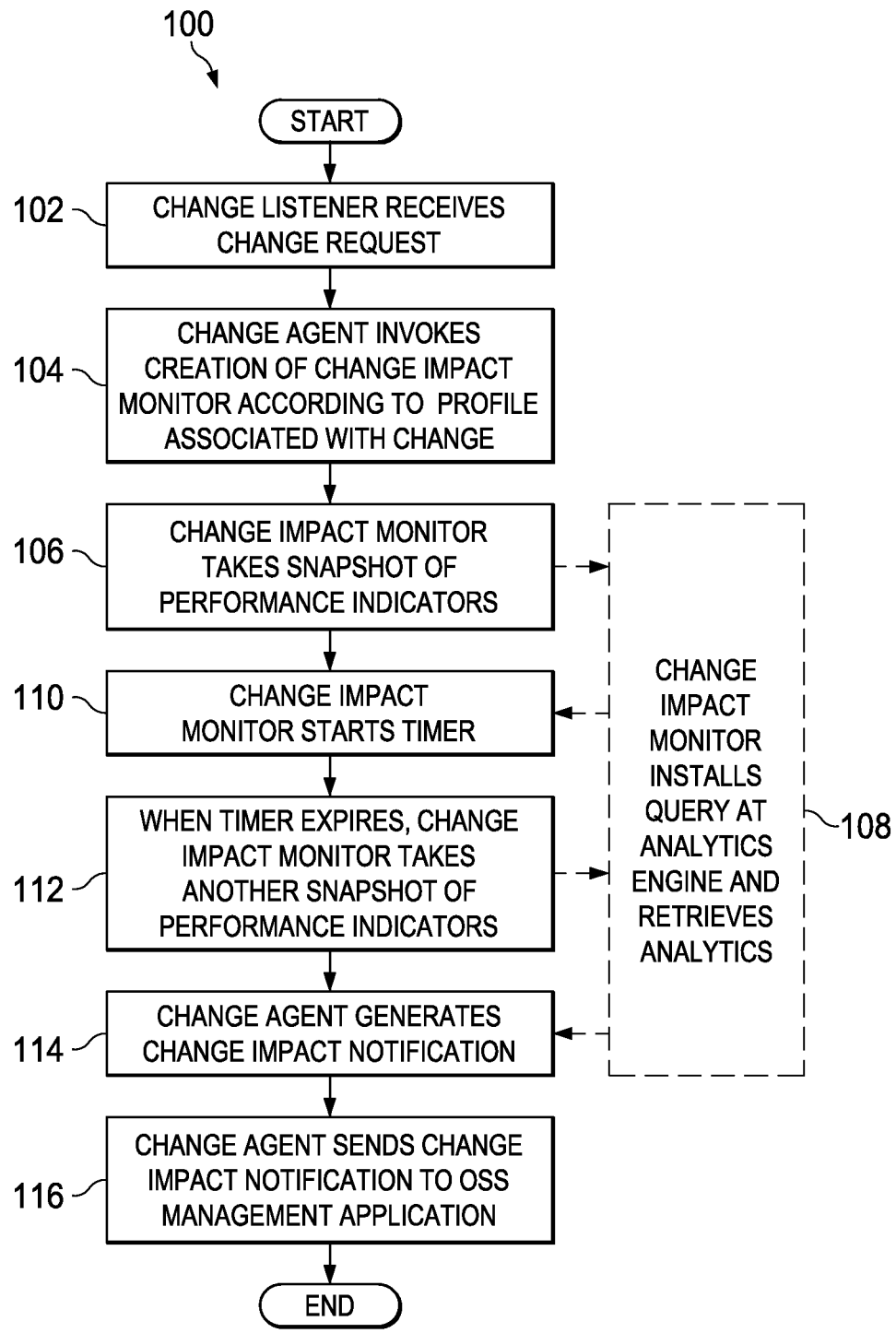
FIG. 4 is a simplified flow diagram illustrating other example operations that may be associated with an embodiment of the communication system.

Turning to FIG. 4, FIG. 4 is a simplified flow diagram illustrating example operations 100 that may be associated with an embodiment of communication system 10. At 102, change listener 18 may receive change request 16 from OSS management application 12. At 104, change agent 20 may invoke creation of change impact monitor 22 according to profile 24 associated with the change. At 106, change impact monitor 22 may take a snapshot of performance indicators according to profile 24. In some embodiments, change impact monitor 22 may install a query at analytics engine 34 and retrieve analytics. At 110, change impact monitor 22 may start timer 30. At 112, when timer 30 expires, change impact monitor 22 may take another snapshot of the performance indicators. At 114, change agent 20 may generate change impact notification 32. At 116, change agent 20 may send change impact notification 32 to OSS management application 12.

Figure 5:
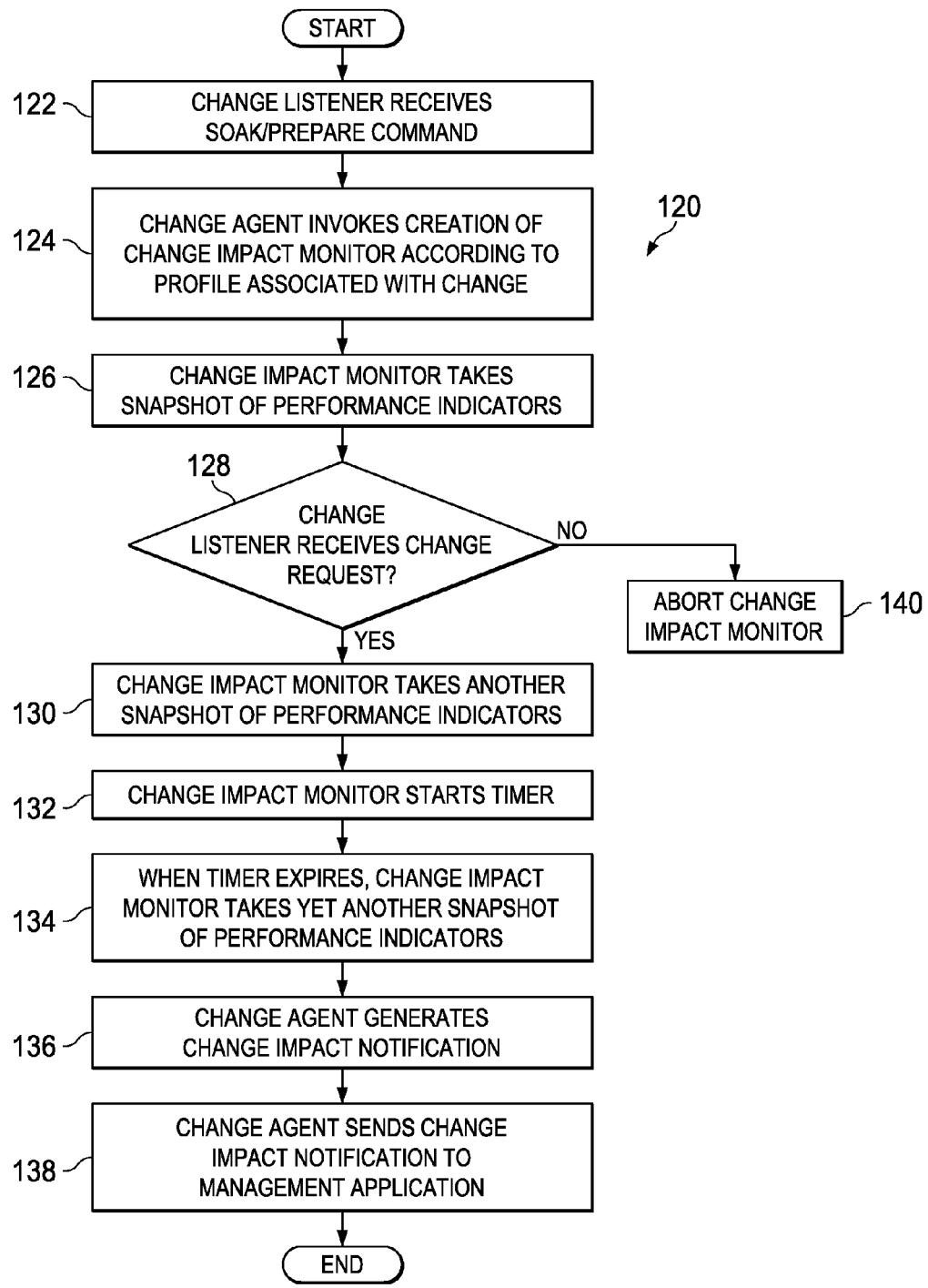
FIG. 5 is a simplified flow diagram illustrating yet other example operations that may be associated with an embodiment of the communication system.

Turning to FIG. 5, FIG. 5 is a simplified flow diagram illustrating example operations 120 that may be associated with an embodiment of communication system 10. At 122, change listener 18 may receive a soak/prepare command. At 124, change agent 20 may invoke creation of change impact monitor 22 according to profile 24 associated with the change anticipated by the soak/prepare command. At 126, change impact monitor 22 may take a snapshot of performance indicators according to profile 24. At 128, a determination may be made whether change listener 18 received change request 16. In some embodiments, the determination may be made a predetermined time interval after the soak/prepare command is received. In other embodiments, change request 16 may trigger the determination when it arrives at network device 12.

At 130, if change request 16 has been received, change impact monitor 22 may take another snapshot of the performance indicators. At 132, change impact monitor 22 may start timer 30. Note that although not illustrated herein, change impact monitor 22 may install a query at analytics engine 34 and retrieve analytics as appropriate during any portion of the operations as described herein. At 134, when timer 30 expires, change impact monitor 22 may take yet another snapshot of the performance indicators. At 136, change agent 20 may generate change impact notification 32. At 138, change agent 20 may send change impact notification 32 to OSS management application 12. Turning back to 128, if change request 16 has not been received after the soak/prepare command, at 140, change impact monitor 22 may be aborted.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, network device 14. In some embodiments, one or more of these features may be implemented in hardware, provided external to these elements, or consolidated in any appropriate manner to achieve the intended functionality. The various network devices (e.g., network device 14 and OSS management application 12) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, network device 14 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 39) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 38) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method executed by a network device in a network, the method comprising:
   receiving, at a change listener in the network device, a change request for a configuration change of the network device;
   invoking, by the change listener, a change agent in the network device;
   creating, by the change agent, a change impact monitor in the network device according to a profile associated with the configuration change;
   interacting, by the change impact monitor, with monitoring instrumentation in the network device;
   taking, by the monitoring instrumentation, a first snapshot of performance indicators when the configuration change is applied;
   taking, by the monitoring instrumentation, a second snapshot of the performance indicators a predetermined duration after applying the configuration change, wherein the predetermined duration is timed by a change impact assessment timer operated by the change impact monitor;
   computing a rate from differences in the performance indicators between the first snapshot and the second snapshot and the predetermined duration; and
   generating, by the change agent, a change impact notification describing the first snapshots the second snapshot and the rate.

2. The method of claim 1, further comprising installing a query at an analytics engine in the network device.

3. The method of claim 1, wherein the profile specifies the performance indicators for the configuration change.

4. The method of claim 3, wherein the configuration change comprises a change to an access control list (ACL), wherein the profile specifies performance indicator as comprising a number of incoming packets, a number of outgoing packets, and a number of packet drops at each interface on which the ACL is configured in the network device.

5. The method of claim 1, further comprising starting the change impact assessment timer after taking the first snapshot, wherein the second snapshot is taken when the change impact assessment timer expires, wherein the change impact assessment timer is configured for the predetermined duration.

6. The method of claim 1, wherein the predetermined duration is specified in the profile.

7. The method of claim 1, further comprising:
   receiving a soak command to persist the configuration change; and
   taking a third snapshot of the performance indicators before applying the configuration change.

8. The method of claim 7, wherein the change request is associated with a soaking policy comprising an instruction to persist change if soaking results in performance improvement.

9. The method of claim 1, wherein the change request is received at the network device from a management application, wherein the network device transmits the change impact notification to the management application.

10. The method of claim 1, wherein the change impact notification includes times at which the first snapshot and the second snapshot were taken and an identifier of the configuration change.

11. Non-transitory tangible media that includes instructions for execution, which when executed by a processor, operates to perform operations comprising:
receiving, at a change listener in the network device, a change request for a configuration change of the network device;
invoking, by the change listener, a change agent in the network device;
creating, by the change agent, a change impact monitor in the network device according to a profile associated with the configuration change;
interacting, by the change impact monitor, with monitoring instrumentation in the network device;
taking, by the monitoring instrumentation, a first snapshot of performance indicators when the configuration change is applied;
taking, by the monitoring instrumentation, a second snapshot of the performance indicators a predetermined duration after applying the configuration change, wherein the predetermined duration is timed by a change impact assessment timer operated by the change impact monitor;
computing a rate from differences in the performance indicators between the first snapshot and the second snapshot and the predetermined duration; and
generating, by the change agent, a change impact notification describing the first snapshot, the second snapshot and the rate.

12. The media of claim 11, wherein the profile specifies the performance indicators for the configuration change.

13. The media of claim 11, wherein the operations further comprise starting the change impact assessment timer after taking the first snapshot, wherein the second snapshot is taken when the change impact assessment timer expires, wherein the change impact assessment timer is configured for the predetermined duration.

14. The media of claim 11, wherein the operations further comprise:
receiving a soak command to persist the configuration change; and
taking a third snapshot of the performance indicators before applying the configuration change.

15. An apparatus, comprising:
a change listener;
monitoring instrumentation;
a memory element for storing data; and
a processor, wherein the processor executes instructions associated with the data, wherein the processor and the memory element cooperate, such that the apparatus is configured for:
receiving, at the change listener, a change request for a configuration change of the apparatus;
invoking, by the change listener, a change agent in the apparatus;
creating, by the change agent, a change impact monitor in the apparatus according to a profile associated with the configuration change;
interacting, by the change impact monitor, with the monitoring instrumentation in the apparatus;
taking, by the monitoring instrumentation, a first snapshot of performance indicators when the configuration change is applied;
taking, by the monitoring instrumentation, a second snapshot of the performance indicators a predetermined duration after applying the configuration wherein the predetermined duration is timed by a change impact assessment timer operated by the change impact monitor;
computing a rate from differences in the performance indicators between the first snapshot and the second snapshot and the predetermined duration; and
generating, by the change agent, a change impact notification describing the first snapshots the second snapshot and the rate.

16. The apparatus of claim 15, further configured for starting the change impact assessment timer after taking the first snapshot, wherein the second snapshot is taken when the change impact assessment timer expires, wherein the change impact assessment timer is configured for the predetermined duration.

17. The apparatus of claim 15, further configured for:
receiving a soak command to persist the configuration change; and
taking a third snapshot of the performance indicators before applying the configuration change.

* * * * *